(12) United States Patent
Kuwabara et al.

(10) Patent No.: US 8,267,209 B2
(45) Date of Patent: Sep. 18, 2012

(54) VEHICLE FRONT STRUCTURE

(75) Inventors: Takuro Kuwabara, Isehara (JP); Fumikazu Kimura, Zama (JP); Motoo Oomori, Tokyo (JP); Takashi Kamiyama, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 856 days.

(21) Appl. No.: 12/338,515

(22) Filed: Dec. 18, 2008

(65) Prior Publication Data
US 2009/0159237 A1 Jun. 25, 2009

(30) Foreign Application Priority Data
Dec. 25, 2007 (JP) ................................ P2007-332175

(51) Int. Cl.
*B60K 11/04* (2006.01)
(52) U.S. Cl. ................ 180/68.4; 180/68.1; 123/41.48
(58) Field of Classification Search ............ 165/41; 180/68.1, 68.3, 68.4, 68.6, 69.25; 123/41.48; 454/309, 143, 145–148, 306, 307
See application file for complete search history.

(56) References Cited

U.S. PATENT DOCUMENTS

| | | | | |
|---|---|---|---|---|
| 4,114,714 A * | 9/1978 | Fachbach et al. | ............. | 180/68.1 |
| 4,566,407 A * | 1/1986 | Peter | ............. | 123/41.48 |
| 4,938,303 A * | 7/1990 | Schaal et al. | ............. | 180/68.1 |
| 5,058,558 A * | 10/1991 | Ueda et al. | ............. | 123/559.1 |
| 5,269,264 A * | 12/1993 | Weinhold | ............. | 123/41.05 |
| 5,564,513 A * | 10/1996 | Wible et al. | ............. | 180/68.3 |
| 6,405,819 B1 * | 6/2002 | Ohkura et al. | ............. | 180/68.1 |
| 7,073,848 B2 * | 7/2006 | Lee | ............. | 296/193.09 |
| 7,114,587 B2 * | 10/2006 | Mori et al. | ............. | 180/68.3 |
| 7,290,630 B2 * | 11/2007 | Maeda et al. | ............. | 180/68.4 |
| 7,410,018 B2 * | 8/2008 | Satou | ............. | 180/68.4 |
| 7,451,844 B2 * | 11/2008 | Kunikata | ............. | 180/68.1 |
| 7,717,204 B2 * | 5/2010 | Kondou et al. | ............. | 180/68.1 |
| 2001/0010275 A1 * | 8/2001 | Sasano et al. | ............. | 180/68.1 |
| 2002/0129981 A1 * | 9/2002 | Satou | ............. | 180/68.6 |
| 2003/0192727 A1 * | 10/2003 | Mori et al. | ............. | 180/68.4 |
| 2005/0230162 A1 * | 10/2005 | Murayama et al. | ............. | 180/68.1 |
| 2006/0102109 A1 * | 5/2006 | Becker et al. | ............. | 123/41.48 |
| 2007/0243818 A1 * | 10/2007 | Clarke | ............. | 454/320 |
| 2008/0191500 A1 * | 8/2008 | Kondou et al. | ............. | 293/117 |
| 2009/0039674 A1 * | 2/2009 | Hassdenteufel et al. | ... | 296/180.1 |
| 2010/0147611 A1 * | 6/2010 | Amano et al. | ............. | 180/68.1 |

FOREIGN PATENT DOCUMENTS

| | | |
|---|---|---|
| JP | 10-213033 A | 8/1998 |
| JP | 3726320 B2 | 10/2005 |
| JP | 2006-205961 A | 8/2006 |

* cited by examiner

*Primary Examiner* — J. Allen Shriver, II
*Assistant Examiner* — Emma K Frick
(74) *Attorney, Agent, or Firm* — Foley & Lardner LLP

(57) ABSTRACT

A vehicle front structure including: a heat exchanger placed upright in a vehicle front part; a left air guide plate formed upright on a left side of the heat exchanger to extend frontward therefrom; a right air guide plate formed upright on a right side of the heat exchanger to extend frontward therefrom; a drain opening formed at a bottom of only one of the left and right air guide plates; and an air intake port for an engine formed above the heat exchanger, and arranged closer to the one of the left and right air guide plates in which the drain opening is formed, from a center of the heat exchanger in a left-right direction.

4 Claims, 3 Drawing Sheets

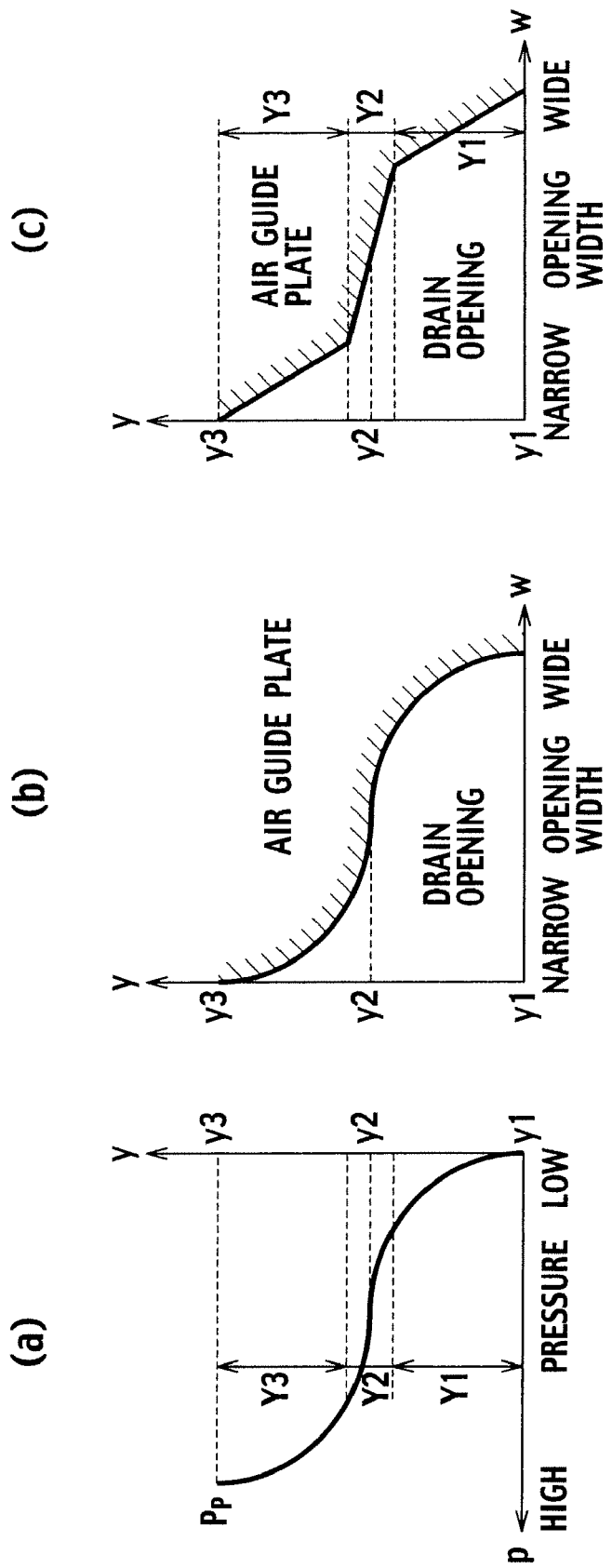

VEHICLE FRONT STRUCTURE

BACKGROUND OF THE INVENTION

1. Field of the Invention

The present invention relates to a vehicle front structure.

2. Description of the Related Art

Japanese Patent Application Laid-open Publication No. 10-213033 discloses a configuration in which a heat exchanger is placed upright in a vehicle front part, and an air intake port for taking in air to be sucked by an engine is formed above the heat exchanger.

Japanese Patent Application Laid-open Publication No. 2006-205961 discloses a configuration in which air guide plates are formed on left and right sides of a heat exchanger so as to extend toward the front of a vehicle. This configuration aims to improve the cooling efficiency of the heat exchanger.

In such a configuration including the air guide plates, space surrounded by the air guide plates and the heat exchanger is formed in front of the heat exchanger. Sometimes, water such as rainwater may accumulate in this space. When a large amount of water accumulates, the water may possibly enter an air intake port of an engine.

As a countermeasure for this problem, Japanese Patent No. 3726320 discloses a structure in which each air guide plate is provided with a drain opening through which the accumulated water may be discharged.

SUMMARY OF THE INVENTION

However, provision of the drain opening to the air guide plate causes the following problem. Specifically, air leaks laterally through the drain opening to the outside of the air guide plate, whereby cooling efficiency of the heat exchanger is degraded.

An object of the present invention is to attain a structure capable of preventing water from entering the air intake port while suppressing degradation in cooling efficiency of a heat exchanger.

An aspect of the present invention is a vehicle front structure comprising: a heat exchanger placed upright in a vehicle front part; a left air guide plate formed upright on a left side of the heat exchanger to extend frontward therefrom; a right air guide plate formed upright on a right side of the heat exchanger to extend frontward therefrom; a drain opening formed at a bottom of only one of the left and right air guide plates; and an air intake port for an engine formed above the heat exchanger, and arranged closer to the one of the left and right air guide plates in which the drain opening is formed, from a center of the heat exchanger in a left-right direction.

BRIEF DESCRIPTION OF THE DRAWINGS

The invention will now be described with reference to the accompanying drawings wherein:

FIG. 3 schematically illustrates variation of an opening width in association with a pressure distribution on a front surface of a heat exchanger of the vehicle front structure according to the embodiment of the present invention. (a) shows the pressure distribution, and (b) and (c) each show the opening width.

DESCRIPTION OF THE PREFERRED EMBODIMENT

Figure 1:
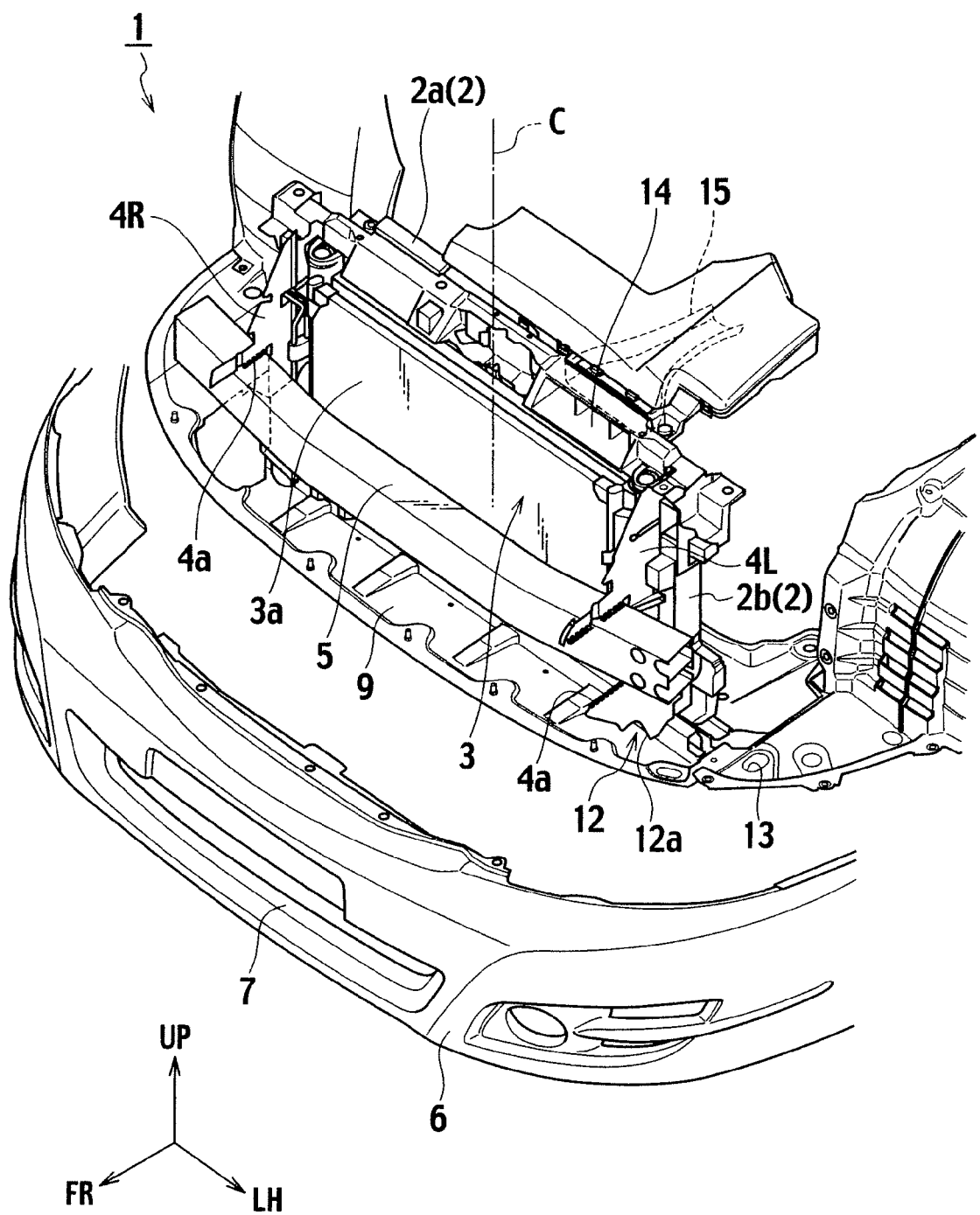
FIG. 1 is an exploded perspective view of a vehicle front structure according to an embodiment of the present invention.

A preferred embodiment of the present invention will be described below with reference to the accompanying drawings. Incidentally, symbols UP, FR, and LH shown in the drawings respectively indicate the upward, frontward, and leftward (left side in a vehicle width direction) of a vehicle.

In a vehicle front structure 1 according to the present embodiment, a radiator core support 2 extends in a vehicle width direction (the left-right direction). A heat exchanger 3 is attached to the radiator core support 2. The heat exchanger 3 includes a radiator for cooling a coolant in a drive unit (not shown) such as an engine, a condenser for an air-conditioning unit, and others. Multiple pieces of these components are often stacked in a front-rear direction. The radiator core support 2 has a radiator core upper portion 2a and radiator core side portions 2b. The radiator core upper portion 2a extends in the vehicle width direction above the heat exchanger 3, and the radiator core side portions 2b are formed at the left and right sides of the heat exchanger 3 so as to extend vertically.

The heat exchanger 3 has a pipe through which a coolant flows, and fins for heat radiation (both not shown). Both the pipe and the fins are formed to be thin (in a direction perpendicular to the front-rear direction of the vehicle). Air is caused to pass through gaps between the pipe and the fins from a front surface 3a side to a back surface side (not shown) of the heat exchanger 3. The coolant flowing in the pipe is cooled down by the air passing through the heat exchanger 3.

The heat exchanger 3 has a substantially rectangular shape when viewed from the front, and is arranged upright so that the main front surface 3a thereof is directed toward the front of the vehicle. Left and right air guide plates 4L and 4R are formed upright on left and right sides of the heat exchanger 3, respectively, so as to extend toward the front of the vehicle. In the present embodiment, each of the air guide plates 4L and 4R is attached to a corresponding one of the radiator core side portions 2b that extend vertically at left and right sides of the heat exchanger 3. The air guide plates 4L and 4R are positioned substantially perpendicular to the vehicle width direction (the left-right direction), and substantially parallel to the front-rear direction and to a vertical direction. The air guide plates 4L and 4R are positioned substantially parallel to each other.

A bumper 5 extends in the vehicle width direction (in the left-right direction) in front of the heat exchanger 3 with space left therebetween. A substantially-rectangular cutout 4a is formed in each of the air guide plates 4L and 4R. Each cutout 4a is open frontward. The bumper 5 is inserted through these cutouts 4a to be fit into the air guide plates 4L and 4R.

An air inlet 7 is formed in a bumper cover 6 which is the outermost layer covering the bumper 5 from the front. The air inlet 7 takes in air which is to be passed through the heat exchanger 3. In the present embodiment, the air inlet 7 has an oblong shape extending in a horizontal direction.

An air passage from the air inlet 7 to the heat exchanger 3 is formed of components such as the left and right air guide plates 4L and 4R, a grille 8, and a floor cover 9. The left and right air guide plates 4L and 4R serve as side walls of the air passage from the air inlet 7 to the heat exchanger 3. A bottom surface of the bumper 5 serves as part of an upper wall of the air passage.

A motor-driven fan 10 is provided behind the heat exchanger 3. The motor-driven fan 10 is an axial fan which forces air to flow from the front to the rear of the heat exchanger 3, and increases the flow velocity of air passing through the heat exchanger 3. Reference numeral 11 represents a fan shroud.

In the present embodiment, a drain opening 12 is formed at the bottom of only one of the left and right air guide plates 4L and 4R (the left air guide plate 4L in this embodiment). Assume a case where water accumulates in a space formed in front of the heat exchanger 3 and between the left and right air guide plates 4L and 4R. In such a case, the provision of the drain opening 12 allows the accumulated water to be discharged laterally through the drain opening 12 to the outside of the air guide plate 4L. However, if the drain opening 12 is formed unnecessarily large, air leaks from the drain opening 12, thereby reducing the amount of air flowing to the heat exchanger 3. This results in degradation of the cooling efficiency of the heat exchanger 3. In the present embodiment, the drain opening 12 is formed in only one of the left and right air guide plates 4L and 4R, namely, the air guide plate 4L. This prevents degradation of the cooling efficiency, as compared to the case where the drain opening is formed in both of the left and right air guide plates 4L and 4R. Incidentally, the water discharged from the drain opening 12 is further discharged downwards from an opening 13 formed in the floor cover 9.

In the present embodiment, the drain opening 12 is formed by cutting out the lower front edge of the air guide plate 4L. For this reason, even at a lower part of the heat exchanger 3 on the side of the drain opening 12 (left side in this embodiment), the air guide effect by use of the air guide plate 4L can still be achieved immediately in front of the lower part of the heat exchanger 3. Accordingly, degradation in the cooling efficiency can be suppressed.

In addition, in the present embodiment, an air intake port 14 is formed in the radiator core upper portion 2a extending in the vehicle width direction above the heat exchanger 3. The air intake port 14 takes in air to be sucked by an engine (not shown). Here, as shown in FIG. 1, the air intake port 14 is formed closer to the air guide plate 4L on which the drain opening 12 is formed, from a center C of the heat exchanger 3 in the left-right direction. The level of accumulated water is lower at the side with the drain opening 12 than at the side without the drain opening 12. For this reason, water can be prevented from entering the air intake port 14 by forming the air intake port 14 closer to the side on which the drain opening 12 is formed, from the center C of the heat exchanger 3 in the left-right direction as in the present embodiment. Reference numeral 15 in the drawings represents a duct.

Figure 2:
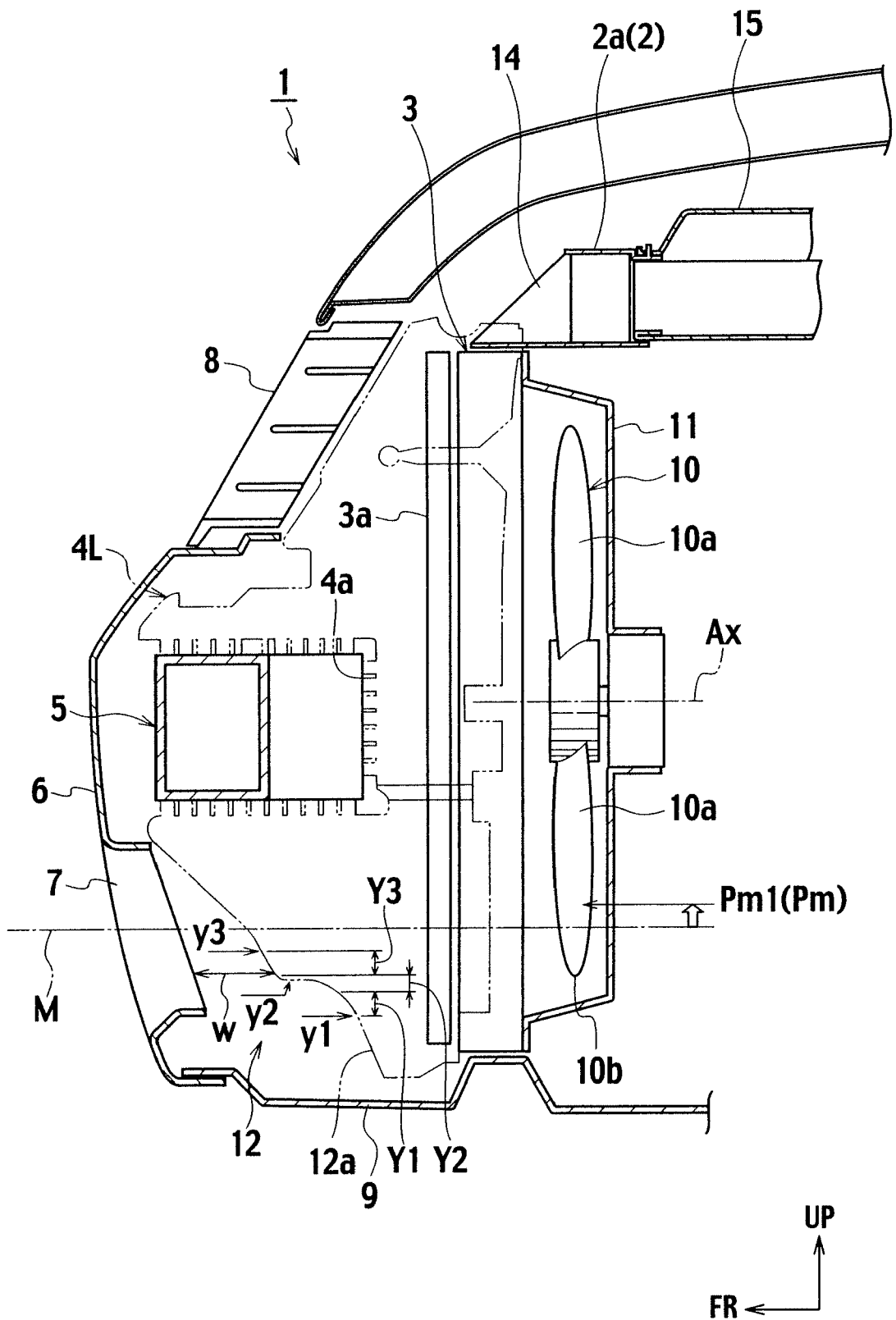
FIG. 2 is a vertical cross section, viewed from the side, of the vehicle front structure according to the embodiment of the present invention.

As shown in FIG. 2, the present embodiment aims to reduce the amount of air leaking from the drain opening 12 by having an opening width w in the front-rear direction of the drain opening 12 vary in the vertical direction. To be more precise, the opening width w is formed to be larger near the bottom of the opening, and to be smaller near the top of the opening. At the same time, an edge 12a of the drain opening 12 has a profile substantially in a shape of letter S which projects downward at the front part of the edge 12a and projects upward at the rear part of the edge 12a. Accordingly, the rate at which the opening width w of the drain opening 12 decreases in an upward direction is varied depending on the position on the edge 12a in the vertical direction (hereinbelow, a term simply expressed as "position" refers to a position (level) in the vertical direction). The reason for varying the opening width w is that, in a lower region of the front surface 3a of the heat exchanger 3, air pressure is low in a lower area and is high in an upper area. To be more specific, a pressure distribution in the lower region of the front surface 3a of the heat exchanger 3 has a profile in the shape of letter S with pressure increasing from the lower end toward the upper end of the region. For this reason, the opening width w of the drain opening 12 is varied to correspond to the profile of the pressure distribution in the shape of letter S (in the present embodiment, the edge 12a below a center M of the air inlet 7 in the vertical direction is formed to have a shape approximately similar to the profile in the shape of letter S). If the opening has the same width throughout, air is more likely to leak where air pressure is high. Therefore, in the course of the flow of air entering from the air inlet 7 and below the bumper 5 to reach the heat exchanger 3, the opening width w is narrowed in an area corresponding to an area having relatively high air pressure, and widened in an area corresponding to an area having relatively low air pressure.

FIG. 3 schematically illustrates the shape of the drain opening 12 in association with the pressure distribution at each position in the vertical direction on the front surface 3a of the heat exchanger 3. (a) shows the pressure distribution, and (b) and (c) each show the shape of the drain opening 12. In FIG. 3, y indicates a position coordinate of the drain opening 12 from its lower edge toward the top, p indicates pressure, and w indicates the opening width (front-rear width).

As shown in FIG. 3, the pressure distribution in the lower region of the front surface 3a of the heat exchanger 3 has a profile in the shape of letter S. Specifically, the pressure increases from the lower end to the upper end of the region so as to form the profile in the shape of letter S which projects downward at the front part thereof and projects upward at the rear part thereof. In other words, a rate of increase of the pressure p (i.e., dp/dy) in a height range between a lower position y1 of the drain opening 12 (at the same level as the lower edge of the air inlet 7) and a middle position y2 (inflection point), monotonically increases from the lower end to the upper end of the height range. The rate of increase of the pressure p (i.e., dp/dy) in a height range between the middle position y2 and an upper position y3 of the drain opening 12 (at a level of approximately ⅓ of the vertical width of the air inlet 7 from the lower edge of the air inlet 7), monotonically decreases from the lower end to the upper end of the height range. The pressure on the front surface 3a of the heat exchanger 3 reaches its maximum at the position y3.

In the present embodiment, the opening width (front-rear width) w of the drain opening 12 in the front-rear direction is set to correspond to the pressure distribution profile. Specifically, a rate of decrease of the opening width w (i.e., −dw/dy) in a height range between the lower level y1 and the middle level y2 (inflection point), monotonically increases from the lower end to the upper end of the height range. The rate of decrease of the opening width w (−dw/dy) in a height range between the middle level y2 and the upper level y3 of the drain opening 12, monotonically decreases from the lower end to the upper end of the height range.

Accordingly, in the present embodiment, the opening width w is narrowed at a position where the pressure p is high, whereas the opening width w is widened at a position where the pressure p is low. Accordingly, air leakage from the drain opening 12 can be suppressed. It should be noted that, since water flows downward by gravity, the drain opening 12 having such a shape has substantially no influence on the drainage of water from the drain opening 12.

Moreover, it can be said from the pressure distribution shown in FIG. 3(a) that the rate of increase of the pressure p (dp/dy) in a middle region Y2 of the drain opening 12 in the vertical direction is larger than the rate of increase of the pressure p (dp/dy) in a lower region Y1 below the middle region Y2, and is also larger than the rate of increase of the pressure p (dp/dy) in an upper region Y3 above the middle region Y2.

Accordingly, the rate of decrease of the opening width w (−dw/dy) in the upward direction in the middle region Y2 of the drain opening 12 is set to be larger than the rate of decrease of the opening width w (−dw/dy) in the upward direction in the lower region Y1 below the middle region Y2, and to be larger than the rate of decrease of the opening width w (−dw/dy) in the upward direction in the upper region Y3 above the middle region Y2

Note that the opening width w need not be varied to completely match the pressure distribution profile. For example, the opening width w may be varied to have a profile of a line-graph form as shown in FIG. 3(c).

Furthermore, in the present embodiment, the center M of the air inlet 7 in the vertical direction is located below a lower edge Pm1 of a maximum negative pressure region Pm on a front surface side of the motor-driven fan 10, as shown in FIG. 2. The motor-driven fan 10 has multiple blades 10a. Each blade 10a has the maximum negative pressure region Pm located between a rotation axis Ax and a blade edge 10b that is the outer end in a radial direction of the blade 10a. Note here that the location of the maximum negative pressure region Pm may be changed depending on the shape or other characteristics of the blade 10a. Since the blade 10a of the motor-driven fan 10 rotates about the rotation axis Ax, the maximum negative pressure region Pm of the motor-driven fan 10 is located in a circular pattern around the rotation axis Ax. Therefore, if the center M of the air inlet 7 in the vertical direction is located below the lower edge Pm1 of the maximum negative pressure region Pm, the flow of air entering from the air inlet 7 and below the bumper 5 is substantially directed upward toward the heat exchanger 3 and the motor-driven fan 10, and a maximum pressure point Pp (see FIG. 3) on the front surface 3a of the heat exchanger 3 is shifted to an upper position. By shifting the maximum pressure point Pp to a higher position, pressure near the drain opening 12 at the lower part of the heat exchanger 3 is lowered. Accordingly, air leakage from the drain opening 12 is reduced, whereby the cooling efficiency of the heat exchanger 3 can be enhanced.

As described above, in the present embodiment, the drain opening 12 is formed at the bottom of any one of the left and right air guide plates 4L and 4R (the left air guide plate 4L in this embodiment). Also, the air intake port 14 is formed closer to the air guide plate 4L in which the drain opening 12 is formed, from the center C of the heat exchanger 3 in the left-right direction. Accordingly, as compared to the case where the drain opening 12 is formed in both of the left and right air guide plates 4L and 4R, the degradation of the cooling efficiency can be suppressed by preventing the air leakage from the drain opening 12. Moreover, since the level of the accumulated water is lower at the side with the drain opening 12, water can be prevented from entering the air intake port 14. As a result, water can be prevented from entering the air intake port 14 while suppressing the degradation of the cooling efficiency.

In addition, in the present embodiment, the opening width (front-rear width) w becomes greater toward the bottom of the drain opening 12, and the drain opening 12 has: a first region (y1 to y2) where a rate of decrease of the opening width w (−dw/dy) in the upward direction increases from the lower end to the upper end of the first region; and a second region (y2 to y3) above the first region (y1 to y2), where the rate of decrease (−dw/dy) decreases from the lower end to the upper end of the second region. The opening width w is varied in the vertical direction to correspond to the pressure distribution profile by making the opening width w wider at a position where the pressure p is lower. Accordingly, air can be prevented from leaking laterally from the drain opening 12 to the outside.

Moreover, in the present embodiment, the opening width (front-rear width) w of the drain opening 12 becomes greater toward the bottom of the opening, and the drain opening 12 has the middle region Y2 in the middle of the drain opening 12 in the vertical direction. In the middle region Y2, a rate of decrease of the opening width w in the upward direction is larger than those in the respective regions Y3 and Y1 above and below the middle region Y2. In other words, the opening width w is varied in the vertical direction to correspond to the pressure distribution profile by making the opening width w wider at a position where the pressure p is lower. Accordingly, air can be prevented from leaking laterally from the drain opening 12 to the outside.

Furthermore, in the present embodiment, the center M of the air inlet 7 in the vertical direction is located below the lower edge Pm1 of the maximum negative pressure region Pm on the front surface side of the motor-driven fan 10. Accordingly, the maximum pressure point Pp on the front surface 3a of the heat exchanger 3 is located at a higher position, whereby the pressure near the drain opening 12 at the lower edge of the heat exchanger 3 is lowered. Consequently, air leakage from the drain opening 12 is reduced, thereby suppressing the degradation of the cooling efficiency of the heat exchanger 3.

The preferred embodiment described herein is illustrative and not restrictive, and the invention may be practiced or embodied in other ways without departing from the spirit or essential character thereof. For example, the shape of the drain opening of the air guide plate is not limited to the example in the above embodiment. The same effect can be obtained as long as the front-rear width of the drain opening is varied in the above-mentioned manner. Otherwise, the drain opening may be formed only in the right air guide plate, and the air intake port may be formed closer to the right side.

The present disclosure relates to subject matters contained in Japanese Patent Application No. 2007-332175, filed on Dec. 25, 2007, the disclosures of which is expressly incorporated herein by reference in its entirety.

What is claimed is:

1. A vehicle front structure comprising:
a heat exchanger placed upright in a vehicle front part;
a left air guide plate formed upright on a left side of the heat exchanger to extend frontward therefrom;
a right air guide plate formed upright on a right side of the heat exchanger to extend frontward therefrom;
a drain opening formed at a bottom of only one of the left and right air guide plates; and
an air intake port for an engine formed above the heat exchanger, and arranged closer to the one of the left and right air guide plates in which the drain opening is formed, from a center of the heat exchanger in a left-right direction,
wherein the drain opening is located on a lower front edge of the only one of the left and right air guide plates in which the drain opening is formed.

2. The vehicle front structure according to claim 1, wherein
a front-rear width of the drain opening becomes greater toward a bottom of the drain opening, and
the drain opening has: a first region in which a rate of decrease of the front-rear width in an upward direction increases from a lower end to an upper end of the first region; and a second region above the first region, in which the rate of decrease of the front-rear width decreases from a lower end to an upper end of the second region.

3. The vehicle front structure according to claim 1, wherein
a front-rear width of the drain opening becomes greater toward a bottom of the drain opening, and
the drain opening has, at its middle part in a vertical direction, a middle region in which a rate of decrease of the front-rear width in an upward direction is larger than a rate of decrease of the front-rear width in an upward direction in a region below the middle region and is larger than a rate of decrease of the front-rear width in an upward direction in a region above the middle region.

4. The vehicle front structure according to claim 1, further comprising:
a motor-driven fan provided behind the heat exchanger;
a bumper cover arranged in front of the heat exchanger; and
an air inlet formed in the bumper cover configured to take in air which is to be passed through the heat exchanger,
wherein a center of the air inlet in the vertical direction is located below a lower edge of a maximum negative pressure region on a front surface side of the motor-driven fan.

* * * * *